United States Patent
Bidner et al.

(10) Patent No.: US 6,411,882 B1
(45) Date of Patent: Jun. 25, 2002

(54) DRIVE-BY-WIRE VEHICLE ENGINE OUTPUT CONTROL SYSTEM

(75) Inventors: David Karl Bidner, Livonia; Mathew Alan Boesch, Plymouth; Gopichandra Surnilla, West Bloomfield, all of MI (US); Jerry D. Robichaux, Tucson, AZ (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/728,890

(22) Filed: Dec. 2, 2000

(51) Int. Cl.⁷ .............. B60T 8/32; G06F 7/00; G06F 17/00; G06F 9/22; G06F 19/00
(52) U.S. Cl. .......... 701/93; 701/110; 701/45; 701/70; 701/115; 701/82; 701/33; 701/54; 123/339.19; 123/350; 123/396; 477/108; 477/97; 477/110; 477/33; 180/170; 180/167; 180/197; 180/169
(58) Field of Search .............. 701/93, 110, 45, 701/70, 115, 82, 33, 54; 123/339.19, 350, 396, 399, 352, 406.2, 568.14, 90.11; 477/97, 110, 108, 33, 100, 43, 111; 180/170, 167, 197, 169

(56) References Cited

U.S. PATENT DOCUMENTS

| | | | | |
|---|---|---|---|---|
| 37,793 | A | * 2/1863 | Searfoss | 241/247 |
| 4,615,316 | A | * 10/1986 | Yasuhara | 123/198 DB |
| 5,123,397 | A | * 6/1992 | Richeson | 123/316 |
| 5,284,116 | A | * 2/1994 | Richeson, Jr. | 123/406.2 |
| 5,365,436 | A | * 11/1994 | Schaller et al. | 307/9.1 |
| 5,400,865 | A | 3/1995 | Togai et al. | |
| 6,078,859 | A | * 6/2000 | Jastrzebski et al. | 123/352 |
| 6,078,860 | A | * 6/2000 | Kerns | 123/399 |
| 6,178,371 | B1 | * 1/2001 | Light et al. | 123/339.12 |
| 6,220,987 | B1 | * 4/2001 | Robichaux et al. | 477/110 |
| 6,279,531 | B1 | * 8/2001 | Robichaux et al. | 123/339.19 |
| 6,295,500 | B1 | * 9/2001 | Cullen et al. | 180/170 |
| 6,304,809 | B1 | * 10/2001 | Cullen et al. | 701/45 |

* cited by examiner

Primary Examiner—William A. Cuchlinski, Jr.
Assistant Examiner—Ronnie Mancho
(74) Attorney, Agent, or Firm—Julia Voutyras

(57) ABSTRACT

A method is presented for improved interaction between driver demand, cruise control system and traction control system in an internal combustion vehicle. Desired engine output torque is adjusted based on the above inputs and vehicle operating conditions. This method improves drive feel and customer satisfaction with vehicle performance.

22 Claims, 3 Drawing Sheets

DRIVE-BY-WIRE VEHICLE ENGINE OUTPUT CONTROL SYSTEM

FIELD OF THE INVENTION

The present invention relates a control of an engine in a "drive-by-wire" vehicle, and more particularly, to a control of engine output torque in response to driver demand, cruise control, and traction control inputs.

BACKGROUND OF THE INVENTION

Vehicles referred to as "drive-by-wire" are the type having no mechanical connection between the accelerator pedal and the throttle valve. Those vehicles are typically equipped with a pedal position sensor whose output is translated into desired engine output torque, and wherein an engine throttle valve is opened a corresponding amount by a motor to achieve the desired engine output torque.

Further, some vehicles are equipped with cruise control systems that automatically control throttle valve opening to maintain the vehicle at a substantially constant speed selected by the driver even when the accelerator pedal is not depressed. Some are also equipped with traction control systems that determine desired engine output torque based on the amount of slip of the wheels of the vehicle in order to improve vehicle performance regardless of road conditions. The need, however, exists for controlling the throttle opening, and therefore engine output torque, by arbitrating between driver demand, cruise control system demand, and traction control system demand. In accordance with a conventional method as described in U.S. Pat. No. 5,400,865, three different target opening angles of the throttle valve are calculated based on driver input, cruise control system demand and traction control system demand. The system chooses one of the three target opening angles to calculate desired engine output torque based on a selected mode of operation. For example, traction control request is selected if the vehicle is in the traction control mode, and the desired throttle opening angle requested by the traction control system is smaller than one or both target opening angles requested by the driver or the cruise control system. If the system is not in a traction control mode, cruise control demand overrides driver demand.

The inventors herein have recognized a disadvantage with the above approach. Namely, on flat or slightly uphill slopes, the driver will not detect a response to pedal depression until the driver requested throttle opening angle exceeds the cruise control requested throttle opening angle, resulting in delayed vehicle response to driver command. Also, on downhill slopes, when the cruise control is engaged and the driver depresses the pedal to accelerate the vehicle, the vehicle response may not be as smooth as desirable.

SUMMARY OF THE INVENTION

An object of the present invention is to provide improved engine output torque control by improving interaction between two or more of the driver demand, cruise control system and traction control system. The above object is achieved and disadvantages of prior approaches overcome by a method for controlling an engine in a vehicle equipped with a constant speed control system, the method consisting of: reading a pedal position sensor output; adjusting said pedal position sensor output when the constant speed control system is engaged; calculating a first target engine output torque based on said adjusted pedal position sensor output; calculating a second target engine output torque based on an operating condition; calculating a desired engine output torque based on said first target engine output torque and said second target engine output torque; and controlling an engine parameter to achieve said desired engine output torque.

In another aspect of the present invention, the above object is achieved and disadvantages of prior approaches overcome by a method for controlling an engine in a vehicle equipped with a cruise control system and a traction control system, the method consisting of: reading a cruise control system output; calculating a first target engine output torque based on said cruise control system output; calculating a second target engine output torque based on an engine operating condition; calculating a third target engine output torque based on a traction control system output; setting a desired engine output torque to be equal to the lesser of said third target engine output torque and a sum of said first target engine output torque and said second target engine output torque; and controlling an engine parameter to achieve said desired engine output torque.

In yet another aspect of the present invention, the above object is achieved and disadvantages of prior approaches overcome by a method for use with an internal combustion engine in an engine coupled to a cruise control system, the method consisting of: calculating a target engine output torque based on an input from the cruise control system; reading a pedal position sensor output; calculating an engine output torque adjustment value based on said pedal position sensor output and on an engine operating condition; and controlling an engine parameter to adjust said target engine output torque based on said calculated engine output torque adjustment value.

An advantage of the above aspects of the present invention is that more precise engine output torque control can be achieved by improving the interaction between the driver demand, cruise control and traction control systems. In accordance with the present invention, if the driver initializes the cruise control and then tips-in from any point of the pedal position, the system will react immediately and smoothly by increasing engine output torque gradually by an incremental value proportional to the pedal position. This will eliminate delayed vehicle response on flat or slightly uphill slopes and will also provide smooth vehicle performance on downhill slopes. This method will therefore improve drive feel and will result in greater driver satisfaction with the vehicle.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DESCRIPTION OF THE INVENTION

Figure 1:
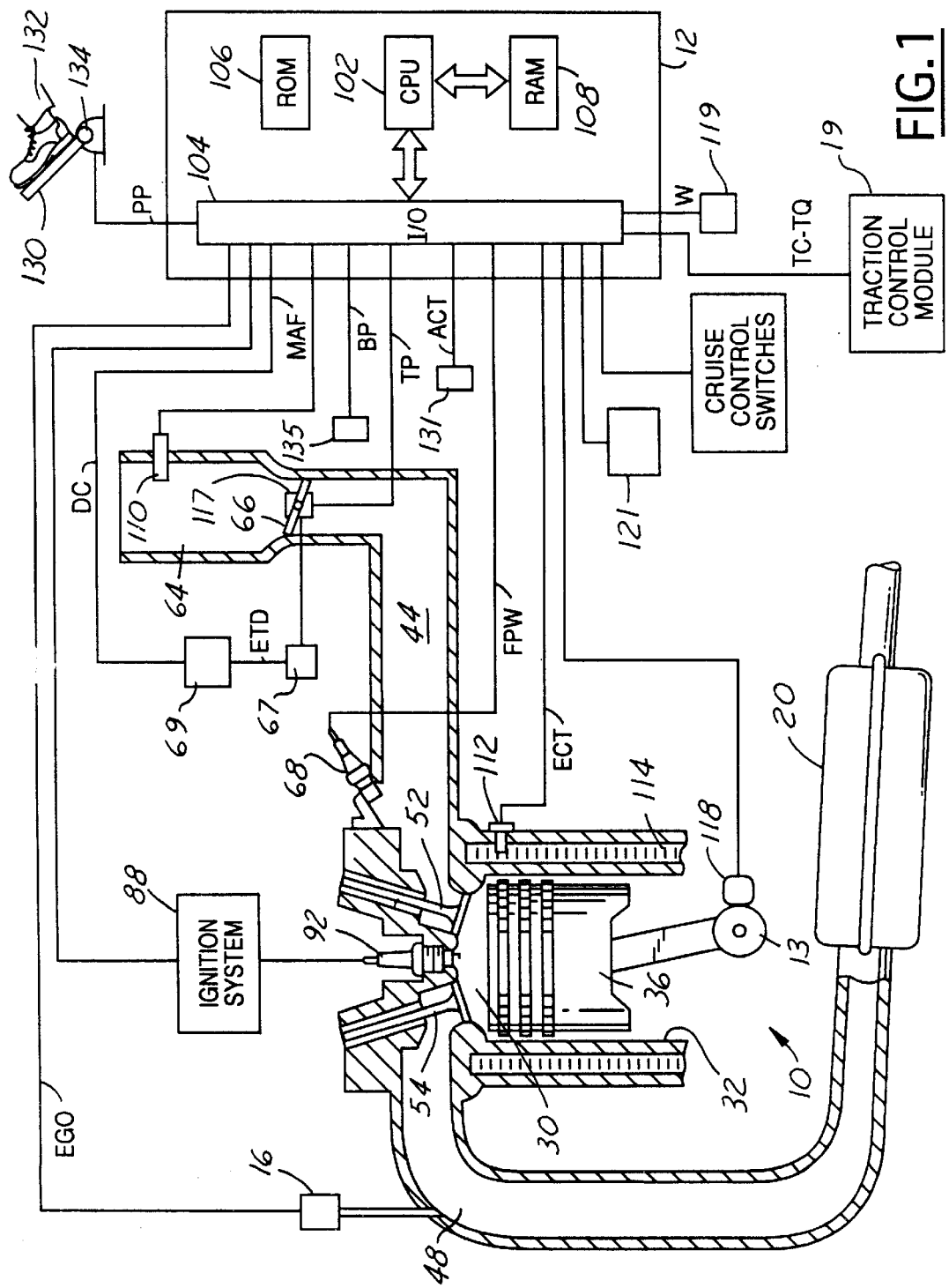
FIG. 1 is a diagram of an exemplary system illustrating various components related to the present invention.

FIG. 1 shows one cylinder in an internal combustion engine 10 having a plurality of cylinders, controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10 including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, a profile ignition pickup signal (PIP) from Hall effect sensor 118 coupled to crankshaft 13 indicating an engine speed (We), barometric pressure form barometric pressure (BP) sensor 135 located in the engine compartment, air charge temperature from the air charge temperature sensor (ACT) 131 located near the MAF sensor 110 or may be calculated by inference from engine speed, MAF and throttle position. Alternatively, turbine speed may be determined from vehicle speed and gear ratio.

In this example, cruise control system features are incorporated into the ECM, however, it could be a stand alone module. The ECM, therefore, also receives cruise control settings from the driver of the vehicle via the ON/OFF/SET/RESUME switches.

Traction Control Module (TCM) 19 calculates desired traction control torque, TC_TQ, based on vehicle operating conditions, such as front and rear wheel speed or wheel slippage, and sends the information to the ECM.

Referring again to FIG. 1, accelerator pedal 130 is shown communicating with the driver's foot 132. Accelerator pedal position (PP) is measured by pedal position sensor 134 and sent to controller 12.

Controller 12 calculates desired engine output torque based on pedal position, cruise control settings and desired traction control torque and adjusts engine operating parameters, such as fuel pulse-width or air/fuel ratio, to achieve desired engine output torque.

Figure 2:
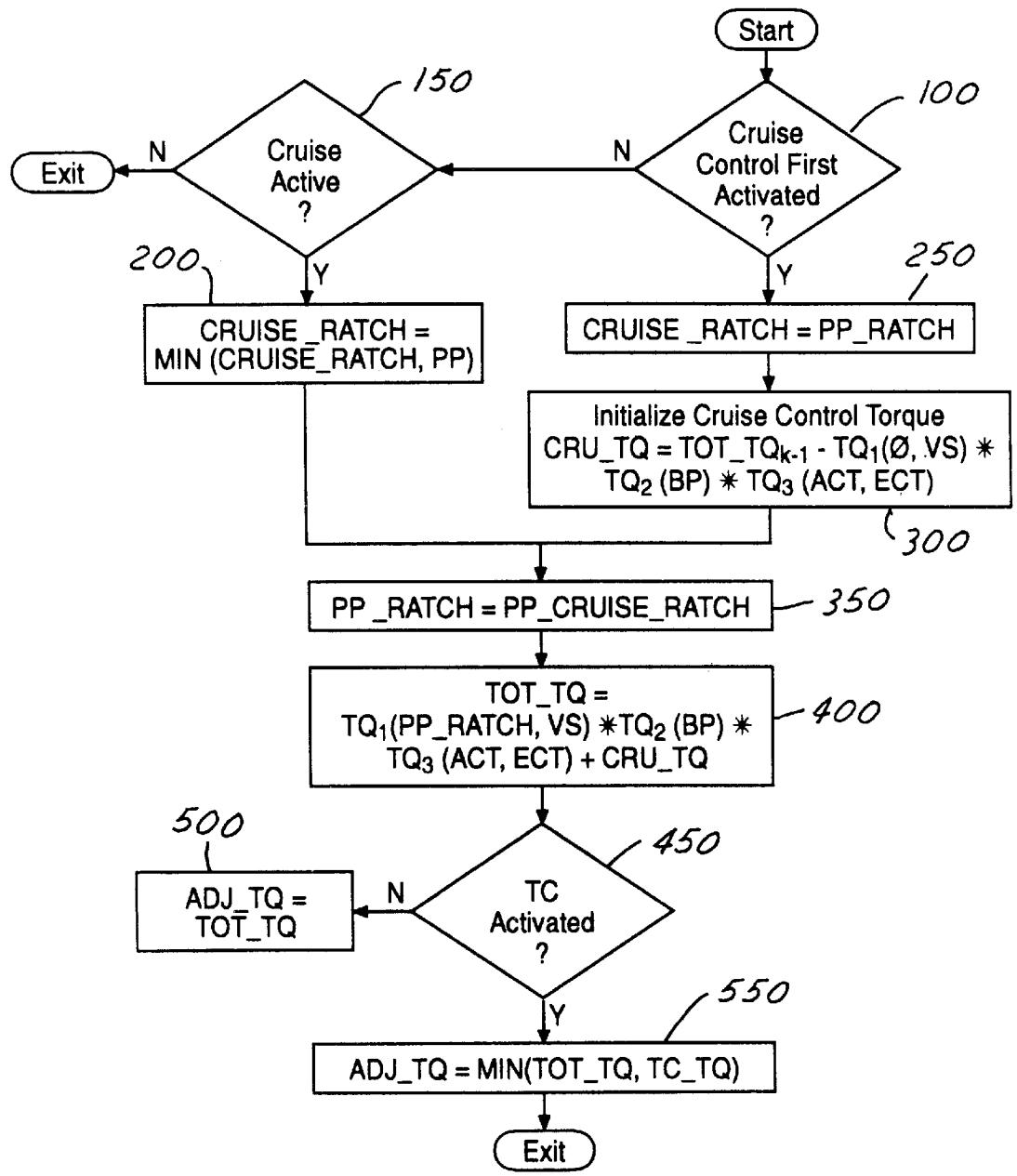
FIG. 2 is a block diagram of a preferred embodiment in accordance with the present invention.

FIG. 2 shows a preferred method in accordance with the present invention for determining engine output torque based on driver request and inputs from the constant speed control system and the traction control system.

First, in decision block 100, a determination is made whether the constant speed control system has just been activated. If the answer to step 100 is NO, logic flow proceeds to a decision block 150 where a determination is made if the constant speed control system is activated. If the answer to step 150 is NO, the routine exits. If the answer to step 150 is YES, logic flow proceeds to step 200 where constant speed control offset CRUISE_RATCH is set to be equal to the lesser of itself and the current pedal position, PP. The routine then proceeds to step 350, which will be described shortly. If the answer to step 100 is YES, logic flows to step 250 where constant speed control offset CRUISE_RATCH is initialized and set to be equal to the current pedal position value, PP, at the time that constant speed control system was first activated. The routine then proceeds to step 300 where desired cruise control torque, CRU_TQ is initialized:

$$CRU\_TQ = TOT\_TQ_{k-1} - TQ_1(0,VS)*TQ_2(BP)*TQ_3(ACT,ECT)$$

where $TOT\_TQ_{k-1}$ is the desired engine output torque just prior to activation of the constant speed control system, $TQ_1$ is the residual wheel torque value for 0 (not depressed) pedal position found in the driver demand table, $TQ_2(BP)$ and $TQ_3(ACT,ECT)$ are torque compensation for barometric pressure (BP), air charge temperature (ACT) and engine coolant temperature (ECT) temperature found in a prestored table. Logic flow then proceeds to step 350 where pedal position offset, PP_RATCH, is set to be equal to the difference between the current pedal position, PP, and constant speed control offset CRUISE_RATCH:

$$PP\_RATCH = PP - CRUISE\_RATCH$$

Next, in step 400, desired engine output torque is calculated as follows:

$$TOT\_TQ = TQ_1(PP\_RATCH,VS)*TQ_2(BP)*TQ_3(ACT,ECT) + CRU\_TQ$$

Logic flow then proceeds to a decision block 450 where a determination is made whether the traction control system is activated. If the answer to step 450 is YES, adjusted desired engine output torque, ADJ_TQ, is set to be equal to the lesser of TOT_TQ calculated in step 400 and desired traction control torque, TC_TQ, as requested by the traction control system. If the answer to step 450 is NO, the routine proceeds to step 500 whereupon adjusted desired engine output torque, ADJ_TQ, is set to be equal to desired engine output torque TOT_TQ calculated in step 400.

Figure 3A:
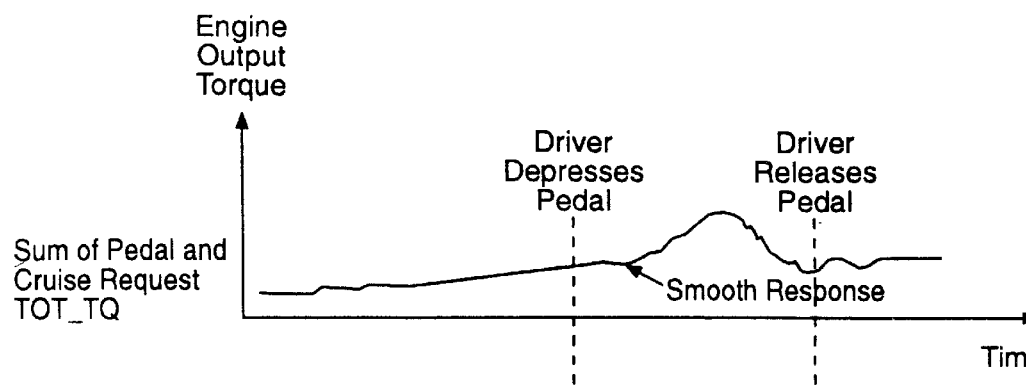
FIG. 3a is a graph of target engine output torque versus time for the preferred method of FIG. 2 on a flat or slightly uphill slope.

FIG. 3a illustrates target engine output torque versus time on a flat or slightly uphill slope for a vehicle equipped with a system in accordance with the present invention. As can be seen in the plot, present invention produces a smooth increase in engine output torque as soon as the pedal is depressed.

Figure 3B:
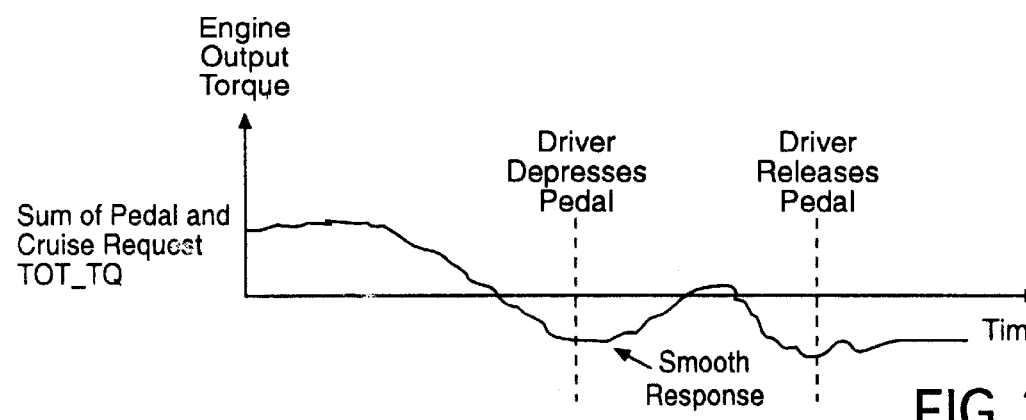
FIG. 3b is a graph of target engine output torque versus time for the preferred method of FIG. 2 on a downhill slope.

Referring now to the plot in FIG. 3b, it can be seen that on long downhill slopes the system of the present invention will result in smooth gradual change in engine output torque both during tip-in and tip-out.

Thus, it can be seen that with this new control scheme desired engine output torque is calculated as the sum of constant speed control system torque and driver demanded torque compensated for various operating conditions. Also, if traction control system is activated, the system arbitrates between the above described desired engine torque and the torque requested by the traction control system by choosing the lesser of the two. Various engine operating parameters, such as air/fuel ratio, engine speed, fuel pulse width, etc., can be adjusted to achieve desired engine output torque. This method provides improved engine output torque control, and results in smoother vehicle response to driver input, constant speed control, and traction control system inputs. It will therefore result in improved vehicle feel, drivability and driver satisfaction.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A method for controlling an engine in a vehicle equipped with a cruise control system and a pedal position sensor, the method comprising:

reading the pedal position sensor output;

adjusting the pedal position sensor output when the cruise control system is engaged;

calculating a first target engine output torque based on the adjusted pedal position sensor output;

calculating a second target engine output torque based on an engine operating condition;

calculating a desired engine output torque based on said first target engine output torque and said second target engine output torque; and adjusting an engine parameter to achieve said desired engine output torque.

2. The method recited in claim 1, wherein said step of calculating said second target engine output torque comprises calculating said second target engine output torque based on a barometric pressure.

3. The method recited in claim 1, wherein said step of calculating said second target engine output torque comprises calculating said second target engine output torque based on an engine coolant temperature.

4. The method recited in claim 1, wherein said step of calculating said second target engine output torque comprises calculating said second target engine output torque based on a vehicle speed.

5. The method recited in claim 1, wherein said step of achieving said desired engine output torque comprises adjusting an air-fuel ratio.

6. The method recited in claim 1, wherein said step of achieving said desired engine output torque comprises adjusting a fuel pulsewidth.

7. The method recited in claim 1, wherein said step of calculating said desired engine output torque further comprises setting said desired target engine output torque to a sum of said first target engine output torque and said second target engine output torque.

8. The method recited in claim 1, wherein the vehicle is further equipped with a traction control system, said method further comprising calculating a target traction control torque based on an operating condition.

9. The method recited in claim 8, wherein said operating condition is a wheel slippage.

10. The method recited in claim 8, wherein said step of calculating said desired engine output torque further comprises setting said desired engine output torque to the lesser of said traction control torque and said sum of said first target engine output torque and said second target engine output torque.

11. A method for controlling an engine in a vehicle equipped with a cruise control system and a traction control system, the method comprising:

obtaining a cruise control system output;

calculating a first target engine output torque based on said cruise control system output;

calculating a second target engine output torque based on an engine operating condition;

calculating a third target engine output torque based on a traction control system output;

setting a desired engine output torque to be equal to the lesser of said third target engine output torque and a sum of said first target engine output torque and said second target engine output torque; and controlling an engine parameter to achieve said desired engine output torque.

12. The method recited in claim 11, wherein said step of obtaining said cruise control system output comprises obtaining a desired vehicle speed.

13. The method recited in claim 11, wherein said step of calculating said second target engine output torque comprises calculating said second target engine output torque based on a barometric pressure.

14. The method recited in claim 11, wherein said step of calculating said second target engine output torque comprises calculating said second target engine output torque based on a vehicle speed.

15. The method recited in claim 11, wherein said step of achieving said desired engine output torque comprises controlling an air/fuel ratio.

16. A system for controlling an engine in a vehicle, comprising:

a cruise control system;

a traction control system; and a controller for reading an operator input, calculating a first target engine output torque based on an output of said cruise control system, calculating a second target engine output torque based on an engine operating condition, calculating a third target engine output torque based on an output of said traction control system, setting a desired engine output torque to be equal to the lesser of said third target engine output torque and a sum of said first target engine output torque and said second target engine output torque, and controlling an engine parameter to achieve said desired engine output torque.

17. The system recited in claim 16, wherein said controller calculates said second target engine output torque based on a vehicle speed.

18. The system recited in claim 16, wherein said controller controls an engine speed to achieve said desired engine output torque.

19. A method for use with an internal combustion engine in an engine coupled to a cruise control system, the method comprising:

calculating a target engine output torque based on an input from the cruise control system;

reading a pedal position sensor output;

calculating an engine output torque adjustment value based on said pedal position sensor output and on an engine operating condition; and controlling an engine parameter to adjust said target engine output torque based on said calculated engine output torque adjustment value.

20. The method recited in claim 19, wherein said step of calculating said engine output torque adjustment value comprises calculating said engine output torque adjustment value based on a vehicle speed.

21. The method recited in claim 20, wherein said step of adjusting said target engine output torque based on said calculated engine output torque adjustment value comprises controlling an engine speed.

22. A method for controlling an engine in a vehicle equipped with a cruise control system and a pedal position sensor, the method comprising:

calculating a pedal position value based on the pedal position sensor output;

calculating a pedal position adjustment value as a difference between a current pedal position value and a pedal position value when the cruise control system is first activated;

calculating a torque adjustment value as a product of a pre-stored torque adjustment value as a function of a vehicle speed and said calculated pedal position adjustment value, a pre-stored torque adjustment value based on a barometric pressure, and a pre-stored torque adjustment value based on an air charge temperature and an engine coolant temperature;

calculating a cruise control system requested torque as a difference between a total desired engine output torque just prior to said cruise control system being activated and said calculated torque adjustment value; and calculating a total desired engine output torque as a sum of said calculated cruise control system requested torque and said calculated torque adjustment value.

* * * * *